US011308779B1

(12) United States Patent
Kelsch et al.

(10) Patent No.: US 11,308,779 B1
(45) Date of Patent: Apr. 19, 2022

(54) SECURITY DEVICE UTILIZING THE ELECTRONIC COMPONENTS OF AN ELECTRONIC GADGET TO PRODUCE AN ALARM

(71) Applicants: Christopher A. Kelsch, Palm Harbor, FL (US); Vanguard Products Group, Inc., Oldsmar, FL (US)

(72) Inventors: Christopher A. Kelsch, Palm Harbor, FL (US); William Claude Chazotte, Indian Rocks Beach, FL (US); John N. Figh, Jr., Oldsmar, FL (US)

(73) Assignee: Vanguard Products Group, Inc., Oldsmar, FL (US)

( * ) Notice: Subject to any disclaimer, the term of this patent is extended or adjusted under 35 U.S.C. 154(b) by 0 days.

(21) Appl. No.: 17/462,689

(22) Filed: Aug. 31, 2021

Related U.S. Application Data (60) Provisional application No. 63/080,228, filed on Sep. 18, 2020.

(51) Int. Cl.
  *G08B 13/14* (2006.01)
  *G08B 13/24* (2006.01)
  *H04W 4/021* (2018.01)

(52) U.S. Cl.
  CPC ..... *G08B 13/2402* (2013.01); *G08B 13/1445* (2013.01); *H04W 4/021* (2013.01)

(58) Field of Classification Search
  CPC G08B 13/2402; G08B 13/1445; H04W 4/021
  USPC ...................................... 340/572.8
  See application file for complete search history.

(56) References Cited

U.S. PATENT DOCUMENTS

| | | | | |
|---|---|---|---|---|
| 4,367,376 A | * | 1/1983 | Proctor | H04M 19/04 340/328 |
| 5,638,046 A | * | 6/1997 | Malinowski | G08B 25/10 340/506 |
| 10,373,456 B2 | * | 8/2019 | Henson | G08B 13/1454 |
| 2002/0153882 A1 | * | 10/2002 | Grimes | G01N 27/72 324/209 |
| 2007/0207772 A1 | * | 9/2007 | Huber | H04M 1/72424 455/404.2 |
| 2008/0106366 A1 | * | 5/2008 | Zhang | G06F 21/88 340/5.1 |
| 2009/0229089 A1 | * | 9/2009 | Galant | A47F 7/024 24/303 |
| 2009/0251318 A1 | * | 10/2009 | Ho | H04W 12/126 340/571 |

(Continued)

*Primary Examiner* — Kerri L McNally
*Assistant Examiner* — Thang D Tran
(74) *Attorney, Agent, or Firm* — Andriy Lytvyn; Smith & Hopen, P.A.

(57) ABSTRACT

The anti-theft device for securing an electronic gadget against theft. A security sensor is attached to a rear surface of the electronic gadget. The security sensor is electrically coupled to the electronic gadget via a cable. A security software application is deployed on the electronic gadget. The security sensor is configured to transmit predefined security signal to the electronic gadget. The security application is configured to detect the predefined security signal. Responsive to detecting a security event, the security sensor stops transmitting the security signal. The security application is configured to transition the electronic gadget into an alarm state if the security application fails to receive the security signal.

17 Claims, 5 Drawing Sheets

(56) References Cited

U.S. PATENT DOCUMENTS

| | | | |
|---|---|---|---|
| 2012/0019383 A1* | 1/2012 | Fawcett | G08B 13/1463 340/568.1 |
| 2012/0280810 A1* | 11/2012 | Wheeler | G08B 13/1445 340/539.11 |
| 2014/0350891 A1* | 11/2014 | Zupke | H04L 13/16 702/189 |
| 2015/0091729 A1* | 4/2015 | Phillips | G08B 13/149 340/568.2 |
| 2017/0039827 A1* | 2/2017 | Li | G08B 13/1445 |
| 2017/0148288 A1* | 5/2017 | Baker | G08B 13/2402 |
| 2017/0300721 A1* | 10/2017 | Blaser | G07C 9/00817 |
| 2018/0047263 A1* | 2/2018 | Burtness | G08B 13/12 |
| 2018/0137729 A1* | 5/2018 | Bottazzi | H04W 4/021 |
| 2018/0182216 A1* | 6/2018 | Grant | G08B 13/2434 |
| 2018/0293857 A1* | 10/2018 | Berglund | G08B 13/1454 |
| 2019/0086243 A1* | 3/2019 | MacDougall | G01D 5/35316 |
| 2019/0392690 A1* | 12/2019 | Helman | G08B 13/1463 |
| 2020/0372770 A1* | 11/2020 | Taylor | H02J 7/0042 |

* cited by examiner

SECURITY DEVICE UTILIZING THE ELECTRONIC COMPONENTS OF AN ELECTRONIC GADGET TO PRODUCE AN ALARM

PRIORITY CLAIM

This non-provisional patent application claims priority to the U.S. Provisional Application No. 63/080,228 filed on Sep. 18, 2020.

BACKGROUND OF THE INVENTION

1. Field of the Invention

This invention relates to merchandise anti-theft devices. More specifically, it relates to a security device for an electronic gadget having a software security application running thereon, wherein the security application is configured to transition the electronic gadget into an alarm state utilizing the electronic components of the electronic gadget to produce an alarm.

2. Brief Description of the Related Art

Retailers often prefer to demonstrate their merchandise to consumers by allowing the consumers to touch, inspect, and interact with the products at a display counter. Many merchandise items, especially electronic gadgets, are relatively expensive and, therefore, are under a serious threat of theft. Retailers often face a dilemma of wanting to attract customers and increase sales by interactively displaying their merchandise, while, at the same time, protecting themselves from potential losses associated with theft.

A variety of anti-theft devices exist in the market that address this problem by offering a wide array of solutions for securing merchandise items against unauthorized removal. Many currently available solutions involve steel cables, locks, clamps, grips, casings, and other obtrusive and unattractive mechanisms. Customers may be deterred from interacting with products that have bulky intimidating security devices attached to them. Moreover, excessive security measures may ruin the overall ambience of a retail store driving customers away and reducing sales.

For all these reasons, security devices using a discrete sensor attached to the rear surface of an electronic gadget have become extremely popular with retailers. However, such devices have a serious flaw: if a thief detaches the sensor from the electronic gadget, tracking the thief—and the stolen electronic gadget—becomes difficult. Thus, what is needed is a security device that intelligently activates an alarm using the electronic components of the electronic gadget itself. In this manner, even if the security sensor is detached from the electronic gadget, the electronic gadget will continue to emit sound, light, or wireless signal alarm enabling the security personnel to track and retrieve the electronic gadget.

SUMMARY OF THE INVENTION

The present invention addresses the heretofore unresolved need stated above with a novel and non-obvious anti-theft device for securing an electronic gadget against theft in retail environment. The invention comprises a security sensor configured to be attached to the rear surface of the electronic gadget. In an embodiment, the security sensor contains electric circuitry configured to periodically generate a predefined security signal. Alternatively, or additionally, the electric circuitry for generating the predefined security signal can be located outside the security sensor, for example, within a pedestal configured to removably support the security sensor or in another remote location.

In an embodiment, the security sensor is electrically coupled to the electronic gadget via an electric cable. The electric cable has a first end coupled to the security sensor and a second end configured to be inserted into a port of the electronic gadget thereby establishing a wired connection between the security sensor and the electronic gadget. The security sensor is configured to periodically transmit the predefined security signal generated by the electric circuitry to the electronic gadget via this wired connection. Alternatively, or in addition to, the security sensor may be configured to periodically or continuously transmit a predefined security signal to the electronic gadget wirelessly. The predefined security signal may have a specific frequency, and the software application can be configured to detect the predefined frequency of the security signal to verify its authenticity. In an embodiment, a communication channel for transmitting the predefined security signal from the security sensor to the electronic gadget is unidirectional, meaning that the electronic gadget does not transmit any signals to the security sensor.

The security device further involves a software application installed and running on the electronic gadget. The software application is configured to detect the predefined security signal received by the electronic gadget. If the software application stops detecting the predefined security signal, the software application will transition the electronic gadget into an alarm state, in which the software application triggers one or more hardware components of the electronic gadget to output an audio alarm, a visual alarm, and/or a wireless signal. The wireless signal alert can be transmitted via a wireless network—for example, a Wi-Fi network within the retail store or a cellular telecommunication network. The wireless signal alert can be transmitted as a Short Message System (SMS) message, an email, a Rich Communication Services (RCS) message, and/or a Multi-Media Message (MMS) message sent to a designated receiving device, for example, security personnel or law enforcement. In an embodiment, the wireless signal may include current global positioning system (GPS) coordinates of the electronic gadget.

Furthermore, in an embodiment of the invention, when the software application transitions the electronic gadget into the alarm state, the software application causes physical and/or virtual buttons/switches of the electronic gadget to become disabled, thereby rendering the electronic gadget inoperable. In this manner, a thief cannot disable the audible/visual alarm and/or wireless transmission being output by the electronic gadget.

As explained above, if the software application stops detecting the security signal, it will trigger an alarm. There are several security events that, when detected by the security sensor, will cause the security sensor to cease transmission of the security signals. Examples of the security events include the following events: the security sensor being removed outside a predefined geofenced boundary of a secure area, the security sensor being detached from the electronic gadget, a tether cable connected to the security sensor being cut or disconnected, or the security sensor being removed from the pedestal. Furthermore, if the electric cable connecting the security sensor to the electronic gadget is cut or disconnected, the wired connection between the security sensor and the electronic gadget will become disrupted, thereby preventing the electronic gadget from receiving the predefined security signal—in which event, the software application will transition the electronic gadget into the alarm state.

DESCRIPTION OF THE DRAWINGS

For a fuller understanding of the invention, reference should be made to the following detailed description, taken in connection with the accompanying drawings, in which:

FIG. 2A schematically depicts security signals being transmitted via the cable from the security sensor to the electronic gadget.

DETAILED DESCRIPTION OF THE PREFERRED EMBODIMENT

In the following detailed description of the preferred embodiment, reference is made to the accompanying drawings, which form a part hereof, and within which specific embodiments are shown by way of illustration by which the invention may be practiced. It is to be understood that other embodiments may be utilized, and structural changes may be made without departing from the scope of the invention.

Figure 1A:
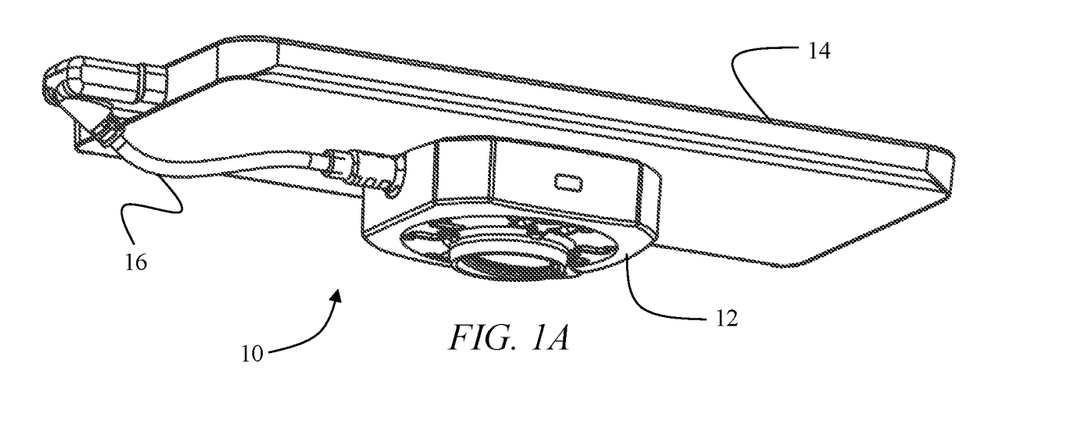
FIG. 1A is a perspective view depicting a security sensor attached to a rear surface of an electronic gadget and an electric cable establishing a wired connection between the electronic gadget to the security sensor.
Figure 1B:
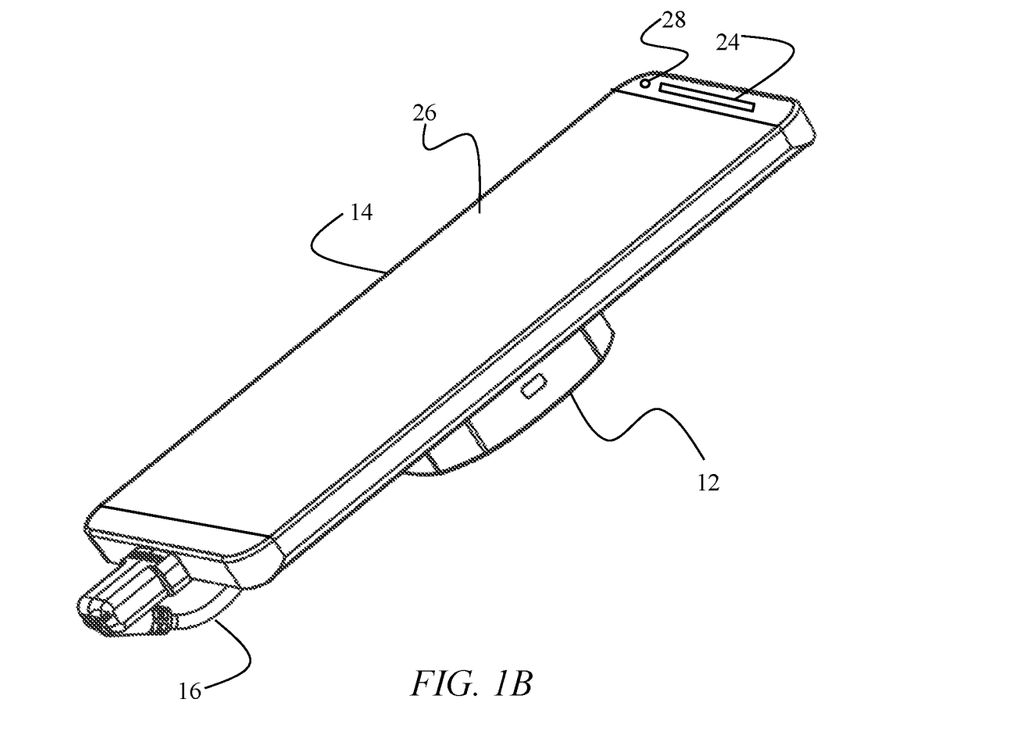
FIG. 1B is a perspective view depicting the front surface of the electronic gadget and the electric cable establishing a wired connection between the security sensor and the electronic gadget.

Referring to FIGS. 1A and 1B, an embodiment of the invention pertains to a security device 10 having a security sensor 12 attached to an electronic gadget 14. In an embodiment, security sensor 12 may be adapted to be attached to a rear surface of electronic gadget 14 using adhesive. Alternatively, security sensor 12 can be affixed to electronic gadget 14 using mechanical brackets (not depicted). Electronic gadget 14 may be equipped with a plurality of electronic components configured to generate an audible or visual output—for example, a speaker 24, a display screen 26, and a light emitting diode (LED) 28. In addition, electronic gadget 14 may include a wireless transmitter configured to wirelessly transmit data.

Security device 10 may further involve an electrical cable 16 connecting electronic gadget 14 to security sensor 12. FIG. 1A depicts that a first end of cable 16 is electrically coupled to security sensor 12, while a second end of cable 16 is electronically coupled to a port of electronic gadget 14. In this manner, electrical cable 16 establishes a wired electrical connection between security sensor 12 and electronic gadget 14.

In an embodiment, security sensor 12 comprises an electric circuitry configured to generate predetermined electrical signals—herein referred to as security signal 18. Security signal 18 is transmitted from security sensor 12 to electronic gadget 14 via the wired connection established therebetween by electrical cable 16. Alternatively, or in addition to, security signal 18 can be transmitted from security sensor 12 to electronic gadget 16 wirelessly. In the embodiment utilizing wireless transmission of security signal 18, examples of wireless transmission include an audio security signal, an optical security signal, an inductive transmission, and/or a radio frequency security signal. Security signal 18 can be configured to be transmitted at a predetermined frequency, for example, ten security signals per second.

Figure 2A:
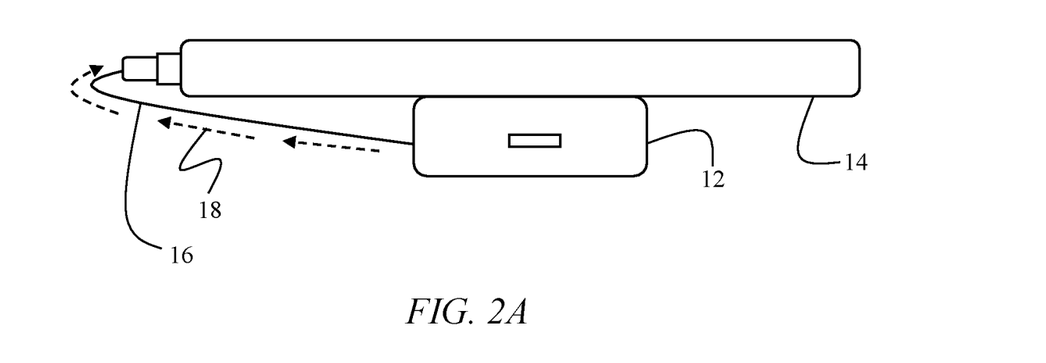
FIG. 2A is a schematic side view depicting the security sensor attached to the electronic gadget and communicatively coupled to a port thereof via an electric cable.

The next aspect of security device 10 pertains to a software application installed and running on electronic gadget 14. As schematically depicted in FIG. 2A, the software application is configured to detect security signal 18 that electronic gadget 14 receives from security sensor 12 via electrical cable 16 or wirelessly. It is not necessary for electronic gadget 14 to communicate back to security sensor 12—i.e., the communication from security sensor 12 to electronic gadget 14 can be unidirectional, meaning that electronic gadget 14 does not need to send any signals to security sensor 12.

Furthermore, no payload data need to be transferred between security sensor 12 and electronic gadget 14. Instead, the electric circuitry disposed within security sensor 12 can simply generate and maintain a security signal 18 having a predefined frequency—i.e., a "heartbeat" signal. Security sensor 12 transmits this "heartbeat" signal to electronic gadget 14. The security software application running on electronic gadget 14 is configured to detect security signal 18 received by electronic gadget 14. While the security application continues to detect the predefined security signal 18, security application does not take any action, and the electronic gadget 14 continues to operate in its normal mode, enabling prospective purchasers to interact with it.

Figure 2B:
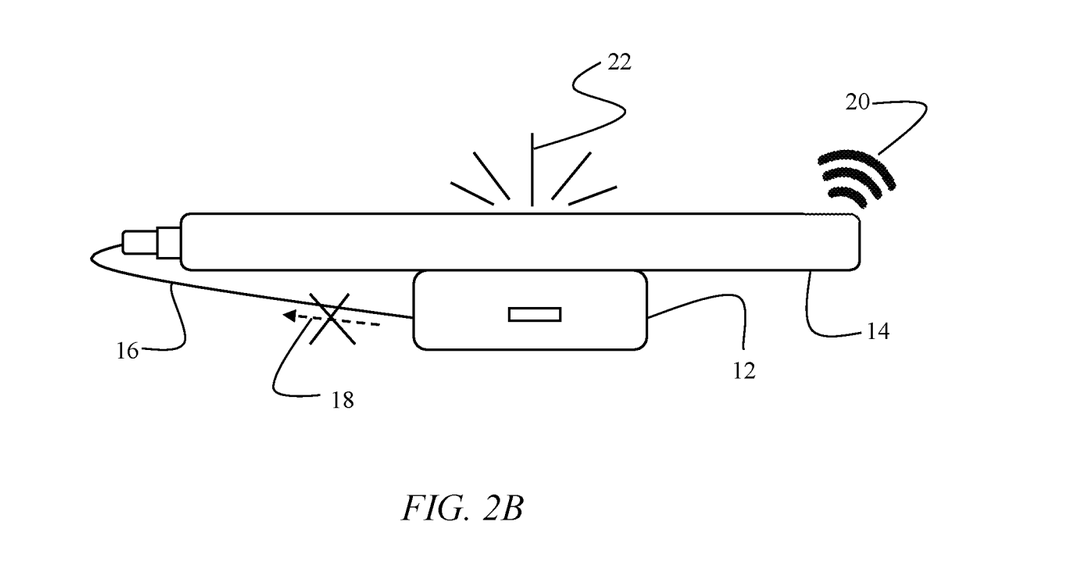
FIG. 2B is a schematic side view depicting the electronic gadget emitting an audible and/or visual alarm in response to cessation of the security signal being transmitted from the security sensor to the electronic gadget.

However, as schematically depicted in FIG. 2B, if the security application stops detecting security signal 18, security application will transition electronic gadget 14 into an "alarm" state, causing electronic gadget 14 to output an audible alarm 20, a visual alarm 22, and/or transmit a predetermined wireless signal to a designated receiver device (the alarm state of electronic gadget 14 is described in more detail below with reference to FIG. 3).

There are several scenarios in which the security application will stop detecting security signal 18. For example, in an embodiment in which security signal 18 is transmitted via the wired connection between electronic gadget 14 and security sensor 12, if a thief were to disconnect or cut electrical cable 16, the wired connection between electronic gadget 14 will be interrupted, and electronic gadget 14 will stop receiving security signal 18 from security sensor 12. Consequently, security application running on electronic gadget 14 will stop detecting security signal 18 and will transition electronic gadget 14 into the alarm state.

In addition, or alternatively, security sensor 12 can be configured to stop transmitting security signal 18 responsive to detecting a predefined security event. Examples of security events include detachment of security sensor 12 from electronic gadget 14 and/or removal of security sensor 12 outside of the geofenced boundaries of a predefined secure area. A person skilled in the art will understand that detection of detachment of security sensor 12 from electronic gadget 14 may be accomplished in many ways known in the art, for example using a push-button that becomes released when security sensor 12 is detached from electronic gadget 14 or an optical sensor configured to detect increased amount of ambient light when electronic gadget 14 is removed from security sensor 12. These are non-limiting examples and other mechanisms can be used for this function without departing from the scope of the invention. Likewise, a person skilled in the art will understand that there are multiple ways of detecting that security sensor 12 has been removed from the retail store. The present invention is agnostic with respect to how security device 10 detects security events.

Figure 3:
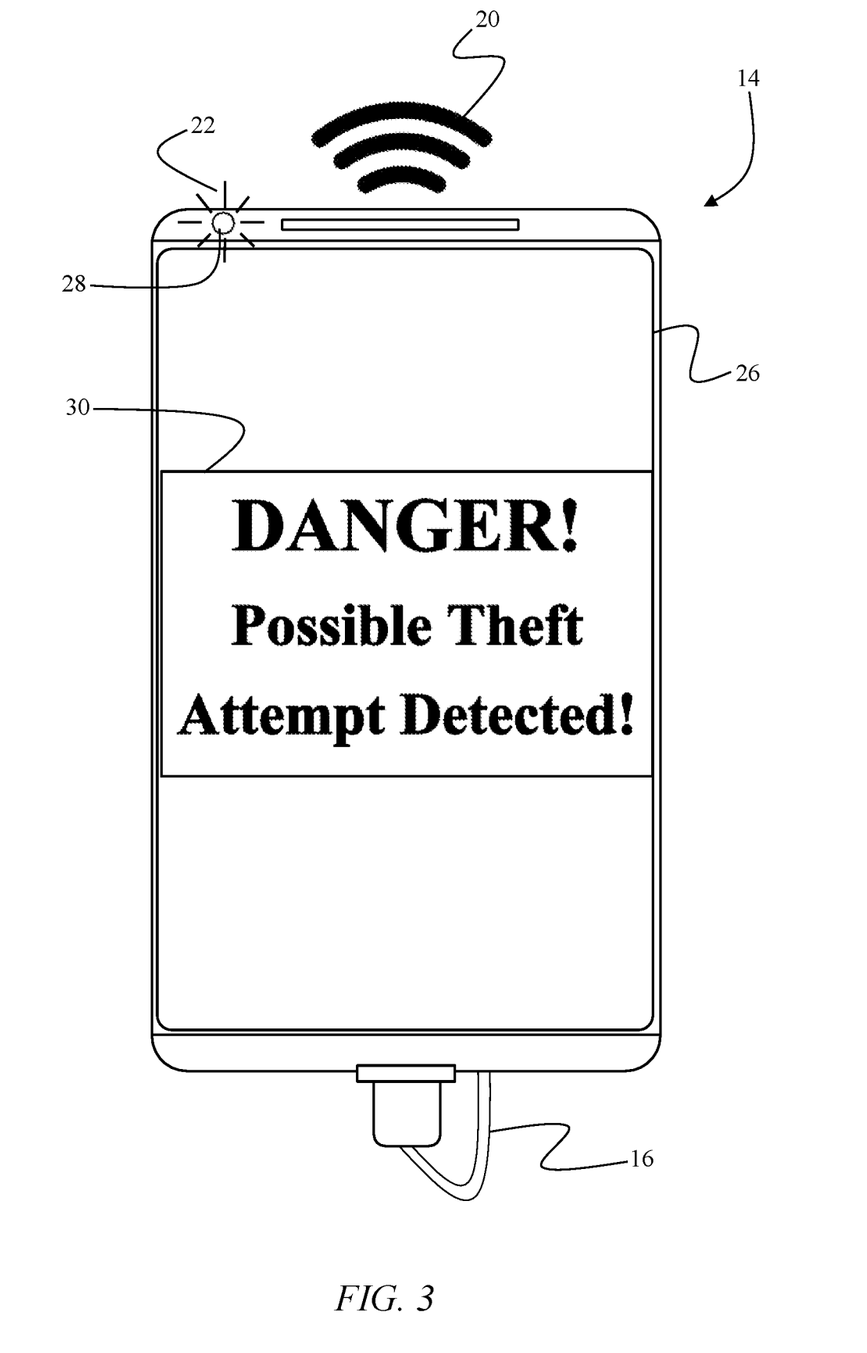
FIG. 3 is a schematic front view depicting the electronic gadget in an alarm state.

Next, FIG. 3 depicts that, after the security software application running on electronic gadget 14 stops detecting security signal 18, security application transitions electronic gadget 14 into an alarm state. As depicted in FIG. 3, in the alarm state, the security application may activate various electrical components of electronic gadget 14 to produce an audible alarm 20, visual alarm 22, and/or an alarm in a form of a wireless signal transmitted to a designated receiver device, for example, law enforcement or security personnel. For example, the security application may be configured to transmit audible alarm 20 via the audio speaker 24 of electronic gadget 14. Furthermore, the security application can trigger various light emitting components of electronic gadget 14, including its screen 26 and notification/photo flash light emitting diodes (LEDs) 28, to flash in a predefined pattern, brightness, and/or color. The security application can be further configured to output an alarm notification 30 on screen 26 of electronic gadget 14. Furthermore, the security application can disable the physical and/or virtual button of electronic gadget 14, such that a thief cannot power down electronic gadget 14 or otherwise disable the alarm using the physical or virtual buttons of electronic gadget 14.

In the manner described above, the security application is configured to use the existing hardware components of electronic gadget 14 to produce an alarm. The audible alarm 20 and visual alarm 22 are configured to attract attention to electronic gadget 14 (and, therefore, the person holding it) and help security personnel to locate the stolen electronic gadget 14 based on the emitted sound and/or light.

Furthermore, the security application may trigger electronic gadget 14 to send notification alarm messages to predefined parties, such as law enforcement, retail store management, etc. The messages may be transmitted as a Short Message System (SMS) message, an email, a Rich Communication Services (RCS) message, a Multi-Media Message (MMS) message, or any other messaging means currently known or implemented in the future. The security application may also cause electronic gadget 14 to transmit its global positioning system (GPS) coordinates to help law enforcement locate the stolen electronic gadget 14. Also, the software application can trigger electronic gadget 14 to transmit a wireless signal to a designated receiver device within the retail store. Upon receipt of this designated alarm signal, a controller can be configured to trigger a storewide alarm, lock the store doors, or execute another automated security response.

In the embodiments described above, the invention utilizes the existing hardware of electronic gadget 14 (e.g., LEDs, speakers, screen, etc.) and/or its connection to a wireless network, such as a Wi-Fi network of the retail store, a cellular network, a Bluetooth® connection, or another type of wireless connection to produce an audio alarm 20, visual alarm 22, and/or wirelessly transmit alert messages to the designated parties. In this manner, the invention utilizes the existing hardware components of electronic gadget 14 for anti-theft security purposes. As a result, security sensor 12 does not need to be equipped with the hardware components already present in electronic gadget 14, thus significantly reducing cost and complexity of security sensor 12.

To further improve reliability of the security device 10, the security software application may be configured to cause electronic gadget 14 to issue a predefined alert if the charge of the battery powering security sensor 12 falls below a predefined threshold. To achieve this functionality, the circuitry within security sensor 12 can be configured to alter security signal 18 when low battery condition is detected. When the security application detects the altered security signal, it will cause electronic gadget 14 to issue an alert—either visually, audibly, and/or via a wireless message transmission—indicating that security sensor 12 battery is low on charge, thereby enabling store personnel to take a corrective measure. If the battery becomes fully discharged, security signal 18 will cease, causing the security application to trigger an alarm.

Figure 4:
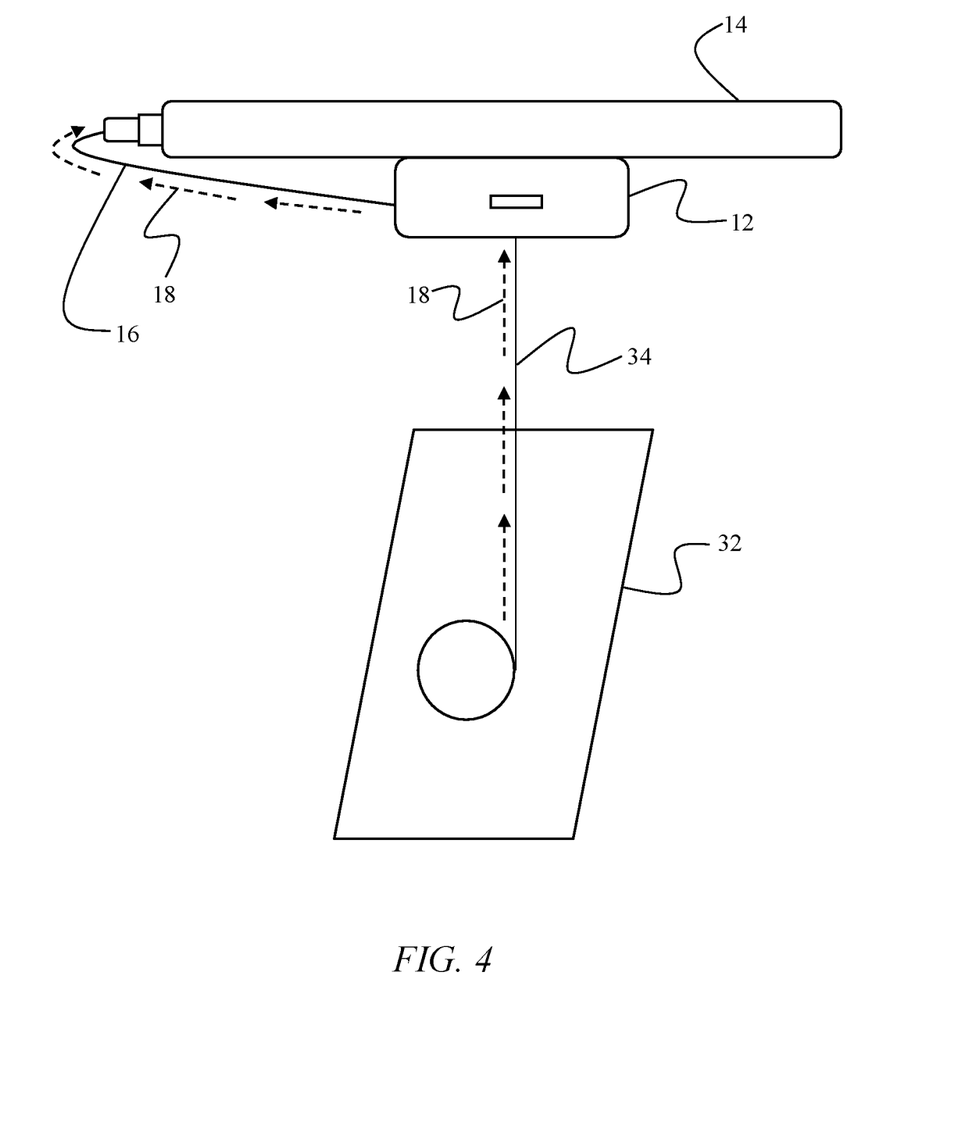
FIG. 4 is a schematic side view depicting an embodiment in which the security signal is generated by the pedestal and relayed to the electronic gadget by the security sensor.

Next, FIG. 4 depicts an embodiment of the invention in which security sensor 12 is configured to rest on a pedestal 32. Pedestal 32 may be positioned on a display counter in a retail store. FIG. 4 further depicts that sensor 12 is connected to pedestal 32 via a tether cable 34. In this embodiment, security sensor 12 can be configured to detect the security events associated with tether cable 34 being cut or disconnected. When security sensor 12 detects that tether cable 34 has been cut or disconnected, security sensor 12 will stop transmitting security signal 18 to article of merchandise 14. Analogously to the embodiment described with respect to FIG. 3, when the security software application stops detecting security signal 18, the security application will transition article of merchandise 14 into an alarm state.

In this embodiment, security signal 18 may be generated by the electric circuitry disposed within pedestal 32 or at a remote location. Security signal 18 can be transmitted to security sensor 12 via tether cable 34 or wirelessly. In this embodiment, security sensor 12 can be configured to relay the received security signal 18 to electronic gadget 14. In this manner, if cable 16 or tether cable 34 is cut or disconnected, electronic gadget 14 will not receive security signal 18. When the security software application running on electronic gadget 14 fails to receive security signal 18, the security application will transition electronic gadget 14 into an alarm state, as described above and depicted in FIG. 3.

In the embodiment depicted in FIG. 4, security sensor 12 and pedestal 32 may both be configured to detect security events. Although, in this embodiment, security signal 18 may be generated by pedestal 32 or remotely, security sensor 12 retains the capability of not relaying security signal 18 to electronic gadget 14. Consequently, upon detecting a security event—for example, security sensor 12 being detached from electronic gadget 14—security sensor 12 will stop relaying security signal 18 to electronic gadget 14, thereby causing the security application to transition electronic gadget 14 into an alarm state. This feature provides redundant security by enabling either security sensor 12 or pedestal 32 to detect a security event and to discontinue transmission of security signal 18 to electronic gadget 14.

Figure 5:
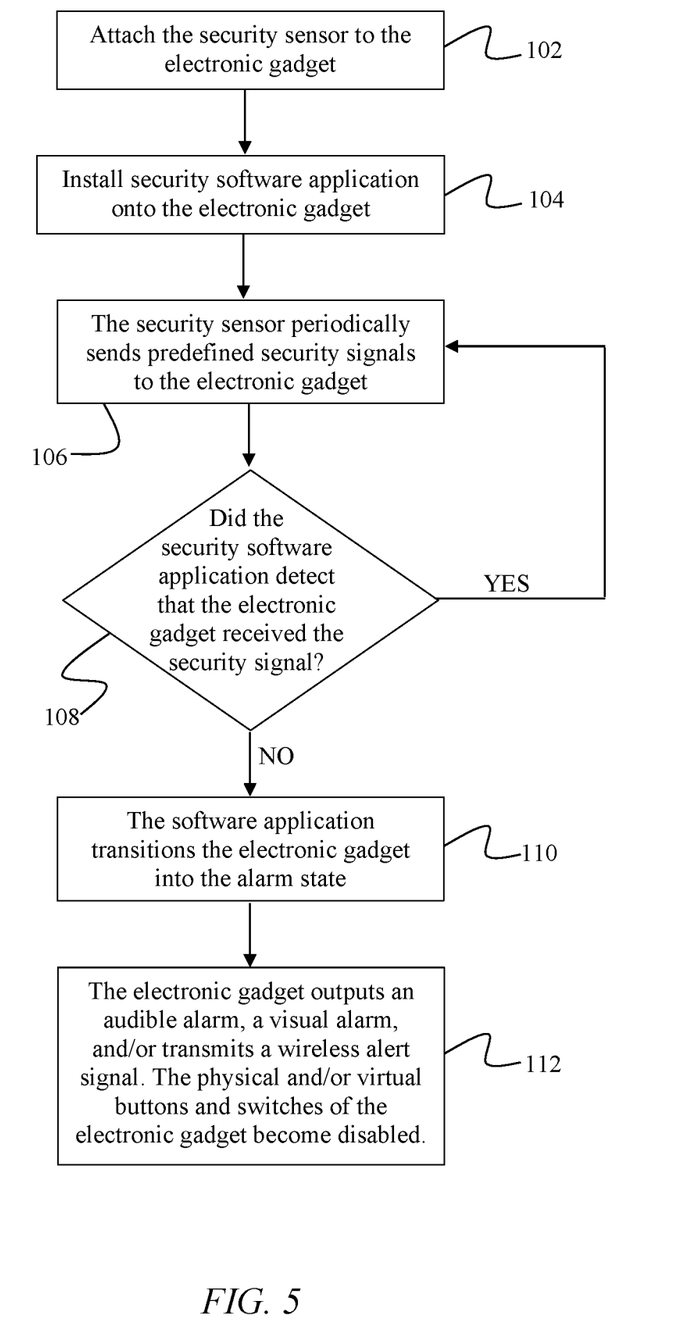
FIG. 5 is a flowchart depicting the method according to which an embodiment of the invention operates.

FIG. 5 provides a flowchart of an exemplary method according to which an embodiment of security device 10 operates. In step 102, security sensor 12 is attached to electronic gadget 14. In the embodiment of security device 10 that uses a wired connection to transmit security signal 18 from security sensor 12 to electronic gadget 14, there is an additional step of connecting electrical cable 16 to a port of electronic gadget 14. Next, in step 104, the security software application is installed on electronic gadget 14. The security software application is configured to verify whether electronic gadget 14 receives security signal 18 from security sensor 12.

In step 106, security sensor 12 transmits security signal 18 to electronic gadget 14. The transmission of security signal 18 can be accomplished via a wired connection between security sensor 12 and electronic gadget 14 via electrical cable 16 and/or as a wireless transmission. As explained above, security signal 18 can be generated by a designated electric circuitry disposed within security sensor 12, pedestal 32, or at a remote location. In step 108, the software application determines whether electronic gadget 14 received the correct security signal 18. If the software application determines that electronic gadget 14 received security signal 18, the software application does not take any action and continues to monitor for continued reception of security signal 18.

If, however, in step 108, the software application determines that electronic gadget 14 did not receive the correct security signal 18, the method proceeds to step 110, in which the software application transitions electronic gadget 14 into an alarm state. In step 112, electronic gadget 14 outputs an audible alarm, a visual alarm, and/or transmits a wireless alert signal. Also, the software application can cause physical and/or virtual buttons and switches of electronic gadget 14 to become disabled. In this manner, a thief will not be able to disarm the alarm being output by electronic gadget 14. In this manner, security personnel can track the stole electronic gadget 14 via audible alarm, visual alarm, and/or GPS coordinates transmitted by electronic gadget 14.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

What is claimed is:

1. An anti-theft device for an electronic gadget, comprising:
    a security sensor configured to be attached to the electronic gadget;
    an electric circuitry disposed within the security sensor, the electric circuitry configured to generate a predefined security heartbeat signal having a predefined frequency;
    an electric cable having a first end coupled to the security sensor and a second end configured to be coupled to a port of the electronic gadget thereby establishing a wired connection between the security sensor and the electronic gadget, wherein the security sensor is configured to transmit the predefined security heartbeat signal generated by the electric circuitry of the security sensor to the electronic gadget via the wired connection, and wherein a software application running on the electronic gadget is configured to detect the predefined security heartbeat signal and verify that the predefined security heartbeat signal being received by the electronic gadget has the predefined frequency; and
    wherein, responsive to a failure to detect the predefined security heartbeat signal having the predefined frequency, the software application is configured to transition the electronic gadget into an alarm state, thereby causing one or more electronic components of the electronic gadget to output an audio alarm, a visual alarm, a wireless signal, or a combination thereof.

2. The anti-theft device according to claim 1, wherein transmission of the predefined security heartbeat signal ceases when a security event is detected, the security event being selected from the group consisting of removing the security sensor outside a predefined geofenced boundary of a secure area, the security sensor losing a wireless connection with a predefined electronic device, detaching the security sensor from the electronic gadget, severing or disconnecting a tether cable connected to the security sensor, and removing the security sensor from a pedestal.

3. The anti-theft device according to claim 1, wherein cutting or disconnecting the electronic cable disrupts the wired connection between the security sensor and the electronic gadget, thereby preventing the electronic gadget from receiving the predefined security heartbeat signal and causing the software application to transition the electronic gadget into the alarm state.

4. The anti-theft device according to claim 1, wherein the electronic gadget is configured to transmit the wireless signal via a wireless network.

5. The anti-theft device according to claim 1, wherein a communication channel for transmitting the predefined security heartbeat signal from the security sensor to the electronic gadget is unidirectional.

6. The anti-theft device according to claim 1, wherein, in the alarm state, the electronic gadget cannot be operated using physical or virtual buttons or switches.

7. The anti-theft device according to claim 1, wherein a wireless signal is transmitted as a Short Message System (SMS) message, an email, a Rich Communication Services (RCS) message, or a Multi-Media Message (MMS) message.

8. A method of securing an electronic gadget, the method comprising:
    installing a software application on the electronic gadget, wherein the security software application is configured to actuate a speaker, a display screen, a light emitting diode (LED), or a wireless transmitter of the electronic gadget;
    attaching a security sensor to the electronic gadget, wherein the security sensor is configured to transmit a predefined security heartbeat signal having a predefined frequency to the electronic gadget, and wherein the security heartbeat signal ceases when a security event occurs; and
    wherein the software application is configured to detect the predefined security heartbeat signal received by the electronic gadget and verify that the predefined security heartbeat signal has the predefined frequency, and wherein, responsive to a failure to detect the predefined security heartbeat signal having the predefined frequency, the software application is configured to transition the electronic gadget into an alarm state by actuating the speaker, the display screen, the light emitting diode (LED), or the wireless transmitter of the electronic gadget, thereby causing the electronic gadget to produce an audio alarm, output a visual alarm, transmit a wireless signal, or a combination thereof.

9. The method according to claim 8, wherein the security event is selected from the group consisting of removing the security sensor outside a predefined geofenced boundary of a secure area, the security sensor losing a wireless connection with a predefined electronic device, detaching the security sensor from the electronic gadget, severing or disconnecting a tether cable connected to the security sensor, and removing the security sensor from a pedestal.

10. The method according to claim 8, wherein the electronic gadget is configured to transmit the wireless signal via a wireless network.

11. The method according to claim 8, wherein the predefined security heartbeat signal is transmitted from the security sensor to the electronic gadget wirelessly.

12. The method according to claim 8, wherein a wireless communication channel for transmitting the predefined security heartbeat signal from the security sensor to the electronic gadget is established without the security sensor receiving any wireless signals from the electronic gadget.

13. The method according to claim 8, wherein the predefined security heartbeat signal is transmitted from the security sensor to the electronic gadget via a unidirectional communication channel.

14. The method according to claim 8, wherein, in the alarm state, the electronic gadget cannot be operated using physical or virtual buttons or switches.

15. The method according to claim 8, wherein the predefined security heartbeat signal is generated by an electric circuitry disposed within the security sensor.

16. The method according to claim 8, wherein the predefined security heartbeat signal is generated by an electric circuitry disposed within a pedestal or in a remote location external from the security sensor.

17. The method according to claim 8, wherein the security sensor is connected to the electronic gadget via an electric cable, and wherein the predefined security heartbeat signal is transmitted via the electric cable.

\* \* \* \* \*